United States Patent [19]

Crissinger et al.

[11] Patent Number: 5,411,751
[45] Date of Patent: May 2, 1995

[54] REDUCING GASTROINTESTINAL IRRITATION IN INFANT NUTRITION

[75] Inventors: Karen D. Crissinger; Patrick Tso, both of Shreveport, La.

[73] Assignee: Research Corporation Technologies, Inc., Tucson, Ariz.

[21] Appl. No.: 187,772

[22] Filed: Jan. 26, 1994

Related U.S. Application Data

[63] Continuation of Ser. No. 867,947, Apr. 13, 1992, abandoned.

[51] Int. Cl.$^6$ .................................................. A23L 1/30
[52] U.S. Cl. .......................................... 426/2; 426/72; 426/74; 426/658; 426/801
[58] Field of Search ..................... 426/2, 72, 74, 623, 426/658, 801; 514/77, 78

[56] References Cited

U.S. PATENT DOCUMENTS

| | | | |
|---|---|---|---|
| 4,298,601 | 11/1981 | Howard | 426/72 X |
| 4,614,663 | 9/1986 | Rule | 426/601 |
| 4,670,285 | 6/1987 | Clandinin et al. | 426/602 |
| 4,753,926 | 6/1988 | Lucas et al. | 514/2 |
| 4,938,984 | 7/1990 | Tomarelli | 426/602 |
| 4,950,656 | 8/1990 | Lichtenberger | 514/78 |

FOREIGN PATENT DOCUMENTS

| | | |
|---|---|---|
| 0115419 | 8/1984 | European Pat. Off. . |
| 0195570 | 8/1986 | European Pat. Off. . |
| 0311091 | 4/1989 | European Pat. Off. . |
| 0391218 | 10/1990 | European Pat. Off. . |
| 0440309 | 8/1991 | European Pat. Off. . |
| 2574089 | 6/1986 | France . |
| 1446431 | 4/1975 | United Kingdom . |
| 1604554 | 5/1980 | United Kingdom . |
| 2033745 | 5/1980 | United Kingdom . |

OTHER PUBLICATIONS

Hawley The Condensed Chemical Dictionary Van Nostrand Reinhoild Co 10th edition (1982) pp. 441, 611 & 970.

*Primary Examiner*—Joseph Golian
*Attorney, Agent, or Firm*—Scully, Scott, Murphy & Presser

[57] ABSTRACT

Food products for nutrition of infants which contain no more than subirritant amounts of free long-chain ($C_{16}$–$C_{22}$) fatty acids and triglycerides thereof are disclosed. Providing esters, such as ethyl esters, of such fatty acids in infant food products essentially eliminates the tendency of the fatty acid to damage the infant intestinal epithelium, but permits absorption and processing of the fatty acid moiety.

14 Claims, No Drawings

REDUCING GASTROINTESTINAL IRRITATION IN INFANT NUTRITION

This invention was made with Government support under Grant No. DK-43785 awarded by the National Institutes of Health. The Government has certain rights in the invention.

This is a continuation of application Ser. No. 867,947 filed on Apr. 13, 1992 and now abandoned.

BACKGROUND OF THE INVENTION

The present invention relates to infant nutrition, and more particularly to the nutrition of premature infants and infants of low birthweight. Such infants are at risk of irritation and damage to the intestinal lining (epithelium), which can lead to serious disorders such as necrotizing enterocolitis. Such disorders can lead to chronic gastrointestinal distress, and can even be fatal to the infant.

It would obviously be desirable to be able to reduce or even to prevent occurrence of intestinal damage in the infant. It is all the more desirable to be able to achieve this objective by enteral administration of an appropriate agent in the infant's food. However, while the etiology of intestinal damage leading to necrotizing enterocolitis is not known, it appears that infants fed exclusively with infant formulas are at higher risk for incurring such damage than are infants fed with breast milk. Confronting this condition through any modification directed at the fatty acid content of formula has not been considered because heretofore it has been presumed that lipids are benign to the infant.

SUMMARY OF THE INVENTION

Surprisingly, it has now been discovered that digestion products of triglycerides, in particular free long-chain fatty acids and monoglycerides, can damage the intestinal epithelium of infants and thus could mediate the onset of disorders such as necrotizing enterocolitis. One aspect of the present invention is thus food products for infant nutrition which contain no free fatty acids and no triglycerides which can be broken down into such free fatty acids, or contain such substances only in amounts thereof which are insufficient to cause such damage. Another aspect of the present invention is the discovery that on enteral administration to infants of monoesters of long-chain fatty acids, including especially esters of linolenic acid and of linoleic acid, the esters can be absorbed and transported through the intestinal epithelium, thus enabling the infant to process the fatty acid moiety, without causing damage to the intestinal epithelium. The esters can be provided to the infant as a supplement to the infant's formula, or can be provided in an infant formula which also provides subirritant amounts of long-chain free fatty acids.

DETAILED DESCRIPTION OF THE INVENTION

As indicated, one significant aspect of the present invention is food products, for providing sources of nutrition to the infant, that contain no free long-chain fatty acids or triglycerides which upon digestion are converted into free long-chain fatty acids. Another aspect is food products that provide long-chain fatty acids (per se and/or as triglycerides thereof which upon digestion yield long-chain fatty acids), but only in amounts insufficient to damage the intestinal epithelium of the infant. Preferably, the food products are essentially free of free fatty acids and of triglycerides thereof.

The tendency of a given fatty acid to damage the intestinal epithelium, and the amount thereof that can be administered without causing damage to the intestinal epithelium, can be assessed with reference to the model described below in Example 1 which detects such damage. Preferably, the maximum amount of a given free long-chain fatty acid or triglyceride should be "subirritant", by which is meant zero up to an amount less than the amount of free fatty acid causing detectable damage. In general, the maximum tolerable content of aggregate free long-chain fatty acids provided in the food product will be less than about 5 mM, preferably less than about 1 mM.

By "long-chain fatty acids" is meant physiologically acceptable compounds of the formula R-COOH wherein R is a straight or branched alkyl group, or an unsaturated or polyunsaturated alkylene chain containing up to 6 carbon-carbon double bonds, and wherein R contains 15 to 21 carbon atoms (so that the fatty acids contain 16 to 22 carbon atoms including the carboxyl group). Examples of such long-chain fatty acids include palmitic, palmitoleic, stearic, oleic, linoleic, linolenic, eleostearic, gadoleic, arachidonic, behenic, cetoleic, 6,9,12,15-octadecatetraenoic, 8,11,14,17-eicosatetraenoic, 5,8,11,14,17-eicosapentaenoic, 7,10,13,16,19-docosapentaenoic, and 4,7,10,13,16,19docosahexaenoic acids. Other long-chain fatty acids known to be toxic, notably ricinoleic and erucic acids, would of course not be utilized.

Triglycerides of long-chain fatty acids, as that term is used herein, are defined by the formula $R_1$-OCH$_2$-CH(OR$_2$)-CH$_2$OR$_3$ wherein $R_1$, $R_2$, and $R_3$ are the same or different and are each the acyl moiety R of $C_{16}$-$C_{22}$ fatty acids as defined in the preceding paragraph.

The present invention encompasses any food product adapted for providing, in whole or in part, nutritive value to an infant human or animal. Such food products thus include a protein source; or a carbohydrate source; or a vitamin source; or a source of medium-chain fatty acids, by which is meant fatty acids of the formula $R^1$-COOH wherein $R^1$ is a straight or branched alkyl group, or an unsaturated or polyunsaturated alkylene group, containing 8 to 12 carbon atoms, e.g. capric acid; or a mineral source; or a combination of any two or more of such sources. The food product may also include one or more of the esters described more fully hereinbelow, alone or in combination with one, two or more of the protein, carbohydrate, vitamin, medium-chain fatty acid, and/or mineral sources. Preferably, the food product is a formula containing a protein source, a carbohydrate source, a vitamin source, a mineral source, a source of medium-chain fatty acids, and one or more of the esters described hereinbelow.

The product may be a ready-to-feed liquid water-based preparation, or in the form of a powder or concentrated liquid adapted to provide a ready-to-feed form by the addition of water and stirring. The product preferably contains (when such is present) about 1.2 to 3.0 g, advantageously about 1.5 g, of protein; about 0.25 to about 2.0 g of medium-chain triglycerides; and about 6 to 9 g carbohydrate per 100 ml of the ready-to-feed liquid formula supplying preferably 60–75 kcal per 100 ml.

Suitable protein sources include casein, salts of casein (e.g., potassium caseinate), whey protein concentrate, soybean protein isolate, cow's milk protein, or hydrolyzed whey or casein protein. Cow's milk protein differs from that of human milk in the proportions present as casein and whey protein. Cow's milk has about 80% casein and 20% whey proteins, whereas human milk has about 40% casein and about 60% whey proteins. Accordingly, the protein used may be adapted to simulate that of human milk by supplementing cow's milk protein with an appropriate amount of whey protein. Because whey contains a very high proportion of the minerals of milk, the whey is subjected to demineralization, in particular by electrodialysis or ultrafiltration, to prepare whey protein. Where a milk-free diet for infants who are intolerant of cow's milk protein is desired, the protein source may be isolate soy protein or hydrolyzed casein or whey proteins. The proteins may be used in combination.

As a carbohydrate source lactose is generally preferred in formulas of normal healthy infants. However, lactose would be contraindicated for infants suffering from galactosemia, lactose intolerance, or cow's milk protein intolerance. (In the latter case, the lactose may contain cow's milk protein.) Where a milk-free diet is desired, the carbohydrate source may be sucrose, corn syrup solids (glucose polymers), or a combination of corn syrup solids with sucrose. The carbohydrates may also be used in combination.

As a source of medium-chain fatty acid, one may employ such fatty acids per se or triglycerides of three such fatty acids.

Additionally, the food product or infant formula can be, or can contain, a nutritionally acceptable quantity of any one or more of the following minerals and vitamins: calcium, phosphorus, potassium, sodium, chloride, magnesium, iron, copper, zinc, manganese, iodine, and selenium; and vitamin A, vitamin D, vitamin E, vitamin $K_1$, vitamin $B_1$, vitamin $B_2$, vitamin $B_6$, vitamin $B_{12}$, vitamin C, pantothenic acid, niacin, folic acid, biotin, choline and inositol. The food product could contain other nutritional factors, such as taurine, carnitine, or nucleotides.

Suitable vitamins and minerals, any or all of which may be included in the infant food products of the present invention, and preferred amounts thereof to include (per 100 ml of infant food product), include the following

| Substance | Amount | |
|---|---|---|
| Vitamin A | 80–160 | micrograms |
| Vitamin C | 20–60 | milligrams |
| Vitamin D | 6–12 | micrograms |
| Vitamin E | 8–16 | milligrams |
| Vitamin K | 5–10 | micrograms |
| Vitamin $B_1$ | 80–200 | micrograms |
| Vitamin $B_2$ | 160–300 | micrograms |
| Vitamin $B_6$ | 85–160 | micrograms |
| Vitamin $B_{12}$ | 0.1–0.7 | micrograms |
| Niacinamide | 0.8–2.0 | milligrams |
| Folic Acid | 40–150 | micrograms |
| Pantothenic Acid | 400–800 | micrograms |
| Biotin | 1–4 | micrograms |
| Sodium | 20–60 | milligrams |
| Chloride | 40–85 | milligrams |
| Calcium | 50–80 | milligrams |
| Phosphorus | 25–40 | milligrams |
| Zinc | 820–1200 | micrograms |
| Iron | 100–800 | micrograms |
| Copper | 85–160 | micrograms |
| Taurine | 2.5–10 | milligrams |
| Carnitine | 1–5 | milligrams |

An infant food product meeting the foregoing description can readily be prepared by standard measuring and mixing techniques well within the abilities of those familiar with the preparation of source products. It will be recognized that the amount of the food product that is administered to the infant at any one time will depend on the size, health, appetite and needs of the infant, and will generally comprise up to about 3 fluid ounces per feeding.

Another significant aspect of the present invention is the discovery of a means by which fatty acids (as defined herein) can be provided in physiologically useful form to the infant, even though free long-chain fatty acids and triglycerides thereof are minimized or excluded from the infant's food as described herein. This discovery is significant since certain long-chain fatty acids, such as linoleic acid and linolenic acid, are believed to be dietary components essential to the proper development of the infant.

More specifically, the fatty acid is provided enterally to the infant as an ester component which comprises a physiologically acceptable ester of the general formula RC(O)OE, wherein the ester component does not damage the intestinal epithelium of the infant. By "physiologically acceptable" is meant that the ester and the esterifying moiety E which cleaves from the ester do not adversely affect the health and development of the infant. Preferred "physiologically acceptable" esters will be those in which the esterifying moiety E is inert to the infant. It has been determined that fatty acid esters meeting this description can be absorbed by and do not damage the intestinal epithelium of the infant, yet provide the fatty acid in free form following absorption of the ester. The tendency, or lack of tendency, of any given ester to damage epithelium can be assessed by carrying out the procedure described in Example 1.

The fatty acids whose esters are administered in accordance with this aspect of the invention are those wherein R is as defined hereinabove, and more preferably are those of the foregoing definition which are saturated, or are unsaturated or polyunsaturated omega-3, omega-6 or omega-9 fatty acids. (The terminology such as "omega-3" refers to the position of a carbon-carbon double bond with respect to the end of the molecule farthest from the —COOH group. For instance, linolenic acid is an omega-3 acid which contains 18 carbon atoms and is unsaturated at the 9, 12, and 15 sites; the 15-site is by convention 3 atoms from the omega end of the molecule, hence, "omega-3"). Most preferred are linoleic, linolenic, and arachidonic acids. Other commonly found dietary fatty acids include oleic, palmitic and stearic acids.

The esterifying moieties E include lower alkyl, by which is meant straight or branched alkyl containing 2 to 6 carbon atoms, the most preferred embodiment of which is ethyl. Indeed, ethyl esters of any fatty acid desired to be administered are most preferred. Also contemplated are glycerol phospholipid esters of inositol, ethanolamine, or choline, by which is meant compounds of the formula $R_4OCH_2-CH(OR_5)-CH_2Op(O)-(X^1)$ wherein $X^1$ is inositol, ethanolamine or choline, and $R_4$ and $R_5$ are the same or different and each is the acyl moiety of a fatty acid as defined above for the moiety R.

The ester or a mixture of such esters can be administered to the infant in a preparation containing no other nutritive component, or can be combined with a protein source; or with a carbohydrate source; or with a vitamin source; or with a source of medium-chain fatty acids; or with a mineral source; or with two or more of such sources. Suitable sources and amounts for the protein, carbohydrate, vitamins, and minerals include those described above with respect to this invention. Also, as described above, products containing the ester and any additional nutritive sources that are present can be prepared as powder, liquid concentrate, or as ready-to-feed liquid. Any such product should contain enough of the one or more esters that are present to provide the esterified fatty acid(s) in amounts up to an amount sufficient to satisfy the dietary needs of the infant, without providing an excessive amount which might for any reason be harmful. Generally, amounts aggregating a total of up to about 4.0 g, preferably about 1.5 to about 3.5 g, of all such esters per 100 ml of the product in its ready-to-feed form will be satisfactory.

It will thus be appreciated that products in accordance with the present invention are particularly useful when administered to infants afflicted with damage to the intestinal epithelium, or to infants susceptible to such damage (such as premature and low-birthweight infants). However, products in accordance with this invention are for that very reason useful when administered to any infant.

EXAMPLE 1

This example describes the model employed for observation of intestinal epithelium damage, and demonstrates the lessening of damage upon perfusion of fatty acid ester. Mucosal changes in newborn piglet intestine before and after ischemia and reperfusion ("I/R") during luminal perfusion with infant formulas and human milk were evaluated.

Methods: Plasma-to-lumen clearance of $^{51}$Cr EDTA (ml/min/100g), was measured in the jejuno-ileum of 1-day-old piglets for 1 hour each of control, ischemia, and reperfusion during luminal perfusion with formulas/milk which were predigested and bile acid solubilized. The perfusates consisted of term formula (Similac, Ross Laboratories, Columbus, Ohio) (3.6% lipid with primarily long-chain fats (LCT)), preterm formula (Special Care, Ross Laboratories, Columbus, Ohio) (3.6% lipid with 50% medium-chain triglycerides (MCT) and 50% LCT), human milk (1% lipid with 70% LCT), and delipidated preterm formula. Gross and histological changes were evaluated after reperfusion.

Results: EDTA clearance was markedly higher for preterm formula than for all other perfusates during control. Following I/R, clearances for preterm formula. were not significantly different from term formula, but were higher than delipidated formula ($p<0.05$). Grossly, all segments perfused with preterm formula appeared gangrenous, while those perfused with term formula were variably hemorrhagic. Intestinal segments perfused with human milk or delipidated formula appeared normal. Histologically, the intestine perfused with preterm formula showed severe villous necrosis and hemorrhage, while that perfused with delipidated formula showed significantly less damage.

Conclusions: The combination of luminal perfusion with infant formulas and I/R results in an animal model of acute phase necrotizing enterocolitis. It appears that removing the lipid from formula significantly attenuates mucosal injury.

EXAMPLE 2

To investigate whether esterification of oleic acid alters its effect on mucosal permeability, $^{51}$Cr-EDTA clearance (ml/min/100 g) during luminal perfusion with oleic acid was compared to that of its ethyl ester. Clearance was measured in the jejunum of 1-day-(n=7), 3-day-(n=5), 2-week(n=6) and 1-mo-(n=6) old piglets after sequential perfusion with saline (20 min) followed by 5 mM solutions of either oleic acid or its ethyl ester (20 min). Mucosal permeability was significantly higher than control in all age groups when oleic acid was perfused ($p<0.05$). In contrast, ethyl oleate did not cause an increase in clearance compared to control values. There was thus a marked difference in permeability observed between oleic acid and its alkyl ester for all age groups ($p<0.05$).

To determine whether the ester was absorbed and transported by the intestine, $^{14}$C-oleic acid and $^{14}$C-ethyl oleate ($^{14}$C incorporated into the acyl chain) were placed for 1 hr into loops of jejunum of 2-wk-old piglets (n=8 loops in each gp). Uptake was 69% and 57% for oleic acid and its ester, respectively, and $^{14}$C-radioactivity was detected in mucosa, lymph, blood, and liver. These studies indicate that the oleic acid-induced increases in intestinal permeability can be abolished when the carboxylic head of the fatty acid is esterified. This difference is not due to lack of absorption of the ethyl ester, as both long-chain fats are absorbed to a similar extent by the mucosa and transported to the systemic circulation.

What is claimed is:

1. A method of feeding an infant without damaging the intestinal epithelium of said infant, comprising enterally administering to said infant a food product
   (i) comprising one or more components selected from the group consisting of a protein source, a carbohydrate source, a vitamin source, a source of medium-chain fatty acids, and a mineral source,
   (ii) which is free of free fatty acids containing 16 to 22 carbon atoms or comprises such acids in amounts insufficient to damage the intestinal epithelium of said infant,
   (iii) which is free of triglycerides of fatty acids containing 16 to 22 carbon atoms or comprises such triglycerides in amounts insufficient to damage the intestinal epithelium of an infant, and
   (iv) which further comprises an ester component selected from the group consisting of lower alkyl esters of fatty acids containing 16 to 22 carbon atoms and mixtures of said esters.

2. A method according to claim 1 of feeding an infant without damaging the intestinal epithelium of said infant, wherein said ester component is selected from the group consisting of lower alkyl esters of saturated fatty acids, of omega-3 fatty acids, of omega-6 fatty acids, and of omega-9 fatty acids, which acids contain 16 to 22 carbon atoms, and mixtures thereof.

3. A method according to claim 2 of feeding an infant without damaging the intestinal epithelium of said infant, wherein said ester component is selected from the group consisting of lower alkyl esters of saturated fatty acids, linoleic, linolenic, and arachidonic acids and mixtures thereof.

4. A method according to claim 1 of feeding an infant without damaging the intestinal epithelium of said infant, wherein said ester component is selected from the group consisting of ethyl esters of fatty acids containing 16 to 22 carbon atoms and mixtures thereof.

5. A method according to claim 1 of feeding an infant without damaging the intestinal epithelium of said infant, wherein said ester component is selected from the group consisting of ethyl linoleate, ethyl linolenate, ethyl arachidonate, ethyl stearate, ethyl palmitate, ethyl oleate, and mixtures thereof.

6. A method of feeding an infant susceptible to necrotizing enterocolitis comprising enterally administering a food product to said infant in accordance with claim 1.

7. A method of feeding an infant susceptible to necrotizing enterocolitis comprising enterally administering a food product to said infant in accordance with claim 2.

8. A method of feeding an infant susceptible to necrotizing enterocolitis comprising enterally administering a food product to said infant in accordance with claim 3.

9. A method of feeding an infant susceptible to necrotizing enterocolitis comprising enterally administering a food product to said infant in accordance with claim 4.

10. A method of feeding an infant susceptible to necrotizing enterocolitis comprising enterally administering a food product to said infant in accordance with claim 5.

11. A method according to claim 1 wherein the amount of free fatty acids containing 16 to 22 carbon atoms is less than about 5 mM.

12. A method according to claim 4 wherein the amount of free fatty acids containing 16 to 22 carbon atoms is less than about 5 mM.

13. A method according to claim 6 wherein the amount of free fatty acids containing 16 to 22 carbon atoms is less than about 5 mM.

14. A method according to claim 9 wherein the amount of free fatty acids containing 16 to 22 carbon atoms is less than about 5 mM.

* * * * *

UNITED STATES PATENT AND TRADEMARK OFFICE
CERTIFICATE OF CORRECTION

PATENT NO. : 5,411,751
DATED : May 2, 1995
INVENTOR(S) : K. D. Crissinger, et al.

It is certified that error appears in the above-indentified patent and that said Letters Patent is hereby corrected as shown below:

On the Title Page, Section [56], under "U.S. PATENT DOCUMENTS", line 6, insert the following:
--5,000,975 3/91 Tomarelli.........426/602-- and under "FOREIGN PATENT DOCUMENTS", line 2: "8/1986" should read --9/1986--

Column 2, line 28: after "19" insert -- - --
Column 5, lines 52-53: after "formula" delete --.--
Column 6, line 8: after "week" insert -- - --

Signed and Sealed this

Seventh Day of November, 1995

Attest:

BRUCE LEHMAN

Attesting Officer     Commissioner of Patents and Trademarks